United States Patent [19]
Apostolo

[11] Patent Number: 5,989,149
[45] Date of Patent: Nov. 23, 1999

[54] AUTOMATIC FRICTION WHEEL TRANSMISSION

[76] Inventor: Mauricio C. Apostolo, 5711 SW. 88 St., Miami, Fla. 33156

[21] Appl. No.: 09/053,120

[22] Filed: Apr. 1, 1998

[51] Int. Cl.⁶ .............................. F16H 15/46; F16H 59/42
[52] U.S. Cl. .............................. 476/5; 74/336 R; 74/344; 74/606 R; 476/11; 476/59
[58] Field of Search ................................... 476/5, 11, 20, 476/59, 60; 74/336 R, 336.5, 342, 344, 606 R

[56] References Cited

U.S. PATENT DOCUMENTS

| | | | |
|---|---|---|---|
| 142,649 | 9/1873 | Pope | 74/342 X |
| 697,629 | 4/1902 | Keiper | 74/606 R X |
| 724,557 | 4/1903 | Dorris | 74/342 X |
| 872,220 | 11/1907 | Boyer | 476/20 X |
| 1,431,977 | 10/1922 | Moorehead | 74/342 |
| 1,702,065 | 2/1929 | Treece | 74/336.5 |
| 3,581,853 | 6/1971 | Hoff | 192/4 |
| 3,604,279 | 9/1971 | Davis | 74/217 B |
| 4,328,877 | 5/1982 | Ballard | 180/70 R |
| 4,972,736 | 11/1990 | Koshimo | 74/730.1 |
| 5,328,419 | 7/1994 | Motl et al. | 475/324 |
| 5,445,567 | 8/1995 | Chattin | 474/78 |

Primary Examiner—Allan D. Herrmann
Attorney, Agent, or Firm—Richard L. Miller, P.E

[57] ABSTRACT

An automatic friction wheel transmission that includes an enclosed case, an input shaft assembly rotatively mounted through the enclosed case, and an output shaft assembly rotatively mounted through the enclosed case and operatively connected to the input shaft assembly for selective rotation therewith. An input low speed friction wheel engages an output low speed friction wheel and an input high speed friction wheel is disengaged from an output high speed friction wheel when a speed sensor initially senses a low speed of an input shaft. The input low speed friction wheel is disengaged from the output low speed friction wheel and the input high speed friction wheel engages the output high speed friction wheel when the speed sensor senses a high speed of the input shaft, by virtue of the speed sensor activating a solenoid, which causes a fork to pivot, which causes the sleeve to slide axially along the input shaft, with the input low speed friction wheel and the input high speed friction wheel moving therewith.

33 Claims, 3 Drawing Sheets

AUTOMATIC FRICTION WHEEL TRANSMISSION

BACKGROUND OF THE INVENTION

1. Field of the Invention

The present invention relates to a transmission. More particularly, the present invention relates to an automatic friction wheel transmission.

2. Description of the Prior Art

Numerous innovations for transmissions have been provided in the prior art that will be described. Even though these innovations may be suitable for the specific individual purposes to which they address, however, they differ from the present invention.

FOR EXAMPLE, U.S. Patent No. 3,581,853 to Hoff teaches a two-speed chain transmission for minibikes, as original equipment or as a conversion kit. High- and low-speed sprockets on a jackshaft are chain driven at different speeds by high and low drive sprockets carried by a centrifugal clutch on the engine shaft. The jackshaft is chain connected to the rear wheel of the bike. The low speed driven sprocket is mounted on the jackshaft by an overrunning clutch which permits the jackshaft to overrun the low drive when it is driven by the high drive. The high-speed sprocket is mounted on the jackshaft by a clutch which is disengageable to let the low-speed drive takeover. A brake acts on the jackshaft on the driven side of the clutches.

ANOTHER EXAMPLE, U.S. Pat. No. 3,604,279 to Davis teaches an engine output shaft that drives the input member of a clutch having a plurality of friction members normally confined around a hub by a garter spring. The clutch has two output drums, each having a sprocket thereon coupled by a chain to a sprocket on a jackshaft which is, in turn coupled through sprockets and a chain to a vehicle drive wheel. The drums have internal surfaces engageable by the friction members due to centrifugal force as the engine speed increases. The drums are of different internal diameter for sequential engagement, and the jackshaft sprockets associated therewith are also of different diameters for a low-speed drive first, and then a high-speed drive.

STILL ANOTHER EXAMPLE, U.S. Pat. No. 4,328,877 to Ballard teaches an automatic two-speed drive system for a vehicle having two drive wheels. A first drive wheel is connected to the drive source through a low-speed hub which is disengaged when the wheel reaches a predetermined rotational speed. The second drive wheel is connectable to the drive source through a high-speed hub which becomes engaged when the drive source reaches a predetermined rotational speed.

YET ANOTHER EXAMPLE, U.S. Pat. No. 4,972,736 to Koshimo teaches a stepless speed-change transmission for a vehicle having an acceleration clutch, comprising a fluid coupling, a forward/backward change-over mechanism coupled to a rear stage of the acceleration clutch, and a stepless speed changer coupled to a rear stage of the forward/backward change-over mechanism; a centrifugal lock-up clutch for the stepless speed-change power transmission for vehicle characterized by that an approximately disc-like output hub is connected to a turbine wheel of a fluid coupling fixed to an output shaft of said acceleration clutch, two side plates are so provided as to sandwich both side faces of the output hub, a damper mechanism is interposed between the side plate and the output hub, and a clutch shoe is provided at an outer peripheral portion of the side plate, which is movable in a radial direction of the side plate by means of a centrifugal force and can be freely engaged with or disengaged from an input member inputting a power from an engine.

STILL YET ANOTHER EXAMPLE, U.S. Pat. No. 3,328,419 to Motl et al. teaches a two-speed transmission for driving an alternator or other engine accessory includes an enclosed gear case. An output shaft passes through both ends of the rear case. Bearings supported on the gear case support the ends of the output shaft. A tubular input shaft surrounds the output shaft and is journaled on the output shaft between the two output shaft support bearings. A planet gear carrier is rotatively journaled on the output shaft inside the gear case. Compound planet gears are rotatively supported by the planet gear carrier with one planet of each compound planet gear in mesh with a sun gear on the tubular input shaft and with a planet of each compound planet gear in mesh with a sun gear on the output shaft. A brake assembly is either applied to lock the planet gear carrier to the gear case or is released to let the planet carrier rotate in the gear case. When the tubular input shaft is driven and the brake assembly holds the planet carrier, torque is transmitted from the input shaft to the input sun gear to the first planet gear to the second planet gear to the output sun gear and to the output shaft. When the brake assembly is released, torque passes from the tubular input shaft directly to the output shaft through a one-way clutch and the input and output shafts run at the same speed. A lubrication system lubricates critical bearings in the transmission.

FINALLY, YET STILL ANOTHER EXAMPLE, U.S. Pat. No. 5,445,567 to Chattin teaches a derailer for derailing a drive chain from one sprocket to an adjacent sprocket of a multi-stage sprocket assembly wherein operation of the derailer thereof is automatically controlled by centrifugal force so that the driving chain is automatically shifted to higher gears as the speed of the bicycle increases.

It is apparent that numerous innovations for transmissions have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an automatic friction wheel transmission that avoids the disadvantages of the prior art.

ANOTHER OBJECT of the present invention is to provide an automatic friction wheel transmission that is simple and inexpensive to manufacture.

STILL ANOTHER OBJECT of the present invention is to provide an automatic friction wheel transmission that is simple to use.

BRIEFLY STATED, YET ANOTHER OBJECT of the present invention is to provide an automatic friction wheel transmission that includes an enclosed case, an input shaft assembly rotatively mounted through the enclosed case, and an output shaft assembly rotatively mounted through the enclosed case and operatively connected to the input shaft assembly for selective rotation therewith. An input low speed friction wheel engages an output low speed friction wheel and an input high speed friction wheel is disengaged from an output high speed friction wheel when a speed sensor initially senses a low speed of an input shaft. The input low speed friction wheel is disengaged from the output low speed friction wheel and the input high speed friction wheel engages the output high speed friction wheel when the speed sensor senses a high speed of the input shaft, by virtue of the speed sensor activating a solenoid, which causes a fork to pivot, which causes the sleeve to slide axially along the input shaft, with the input low speed friction wheel and the input high speed friction wheel moving therewith.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING

Two-Speed Embodiment 10 automatic friction wheel transmission of the present invention
12 enclosed case
14 input shaft assembly
16 output shaft assembly
18 lower portion of enclosed case 12
20 upper portion of enclosed case 12
22 nuts of enclosed case 12
24 bolts of enclosed case 12
26 input shaft of input shaft assembly 14
28 pair of support bearings of input shaft assembly 14
30 pair of ends of input shaft 26 of input shaft assembly 14
31 nut of input shaft assembly 14
32 prime mover
34 another nut of input shaft assembly 14
36 keyway in input shaft 26 of input shaft assembly 14
37 nut of shaft assembly
38 sleeve of input shaft assembly 14
39 washer of shaft assembly
40 coil spring of input shaft assembly 14
41 keyway in sleeve 38 of input shaft assembly 14
42 low speed friction wheel of input shaft assembly 14
43 key of input shaft assembly 14
44 high speed friction wheel of input shaft assembly 14
45 all beveled edges of high speed friction wheel 44 of input shaft assembly 14
46 output shaft of output shaft assembly 16
47 all beveled edges of low speed friction wheel 42 of input shaft assembly 14
48 pair of support bearings of output shaft assembly 16
50 pair of ends of output shaft 46 of output shaft assembly 16
52 load on output shaft assembly 16
54 nut of output shaft assembly 16
56 low speed friction wheel of output shaft assembly 16
57 all beveled edges of low speed friction wheel 56 of output shaft assembly 16
58 high speed friction wheel of output shaft assembly 16
59 all beveled edges of high speed friction wheel 58 of output shaft assembly 16
60 speed changer assembly
62 fork of speed changer assembly 60
64 bifurcated end of fork 62 of speed changer assembly 60
66 other end of fork 62 of speed changer assembly 60
68 solenoid of speed changer assembly 60
70 plunger of solenoid 68 of speed changer assembly 60
72 speed sensor of speed changer assembly 60

Three Speed Embodiment 110 automatic friction wheel transmission of the present invention
114 shaft assembly
126 input shaft of input shaft assembly 114
132 prime mover
134 nut of shaft assembly
136 splines in input shaft 126 of input shaft assembly 114
137 washer of shaft assembly
138 sleeve of input shaft assembly 114
139 plurality of slip clutches dividing sleeve 138 of input shaft assembly 114
141 corresponding grooves in sleeve 138 of input shaft assembly 114
142 low speed frictional wheel of input shaft assembly 114
143 intermediate speed friction wheel of input shaft assembly 114
144 high speed friction wheel of input shaft assembly 114
145 all beveled edges of intermediate speed friction wheel 143 of input shaft assembly 114
146 output shaft of output shaft assembly 116
157 intermediate speed friction wheel of output shaft assembly 116
159 all beveled edges of intermediate speed friction wheel 157 of output shaft assembly 116
160 speed changer assembly
162 plurality of bores in input shaft 126 of input shaft assembly 114
164 exterior of input shaft 126 of input shaft assembly 114
168 plurality of throughbores in sleeve 138 of input shaft assembly 114
170 plurality of arms of speed changer assembly 160

172 proximal end of each arm of plurality of arms 170 of speed changer assembly 160

174 body of each arm of plurality of arms 170 of speed changer assembly 160

176 distal end of each arm of plurality of arms 170 of speed changer assembly 160

178 plurality of springs of speed changer assembly 160

DETAILED DESCRIPTION OF THE PREFERRED EMBODIMENT

Figures 1, 3:
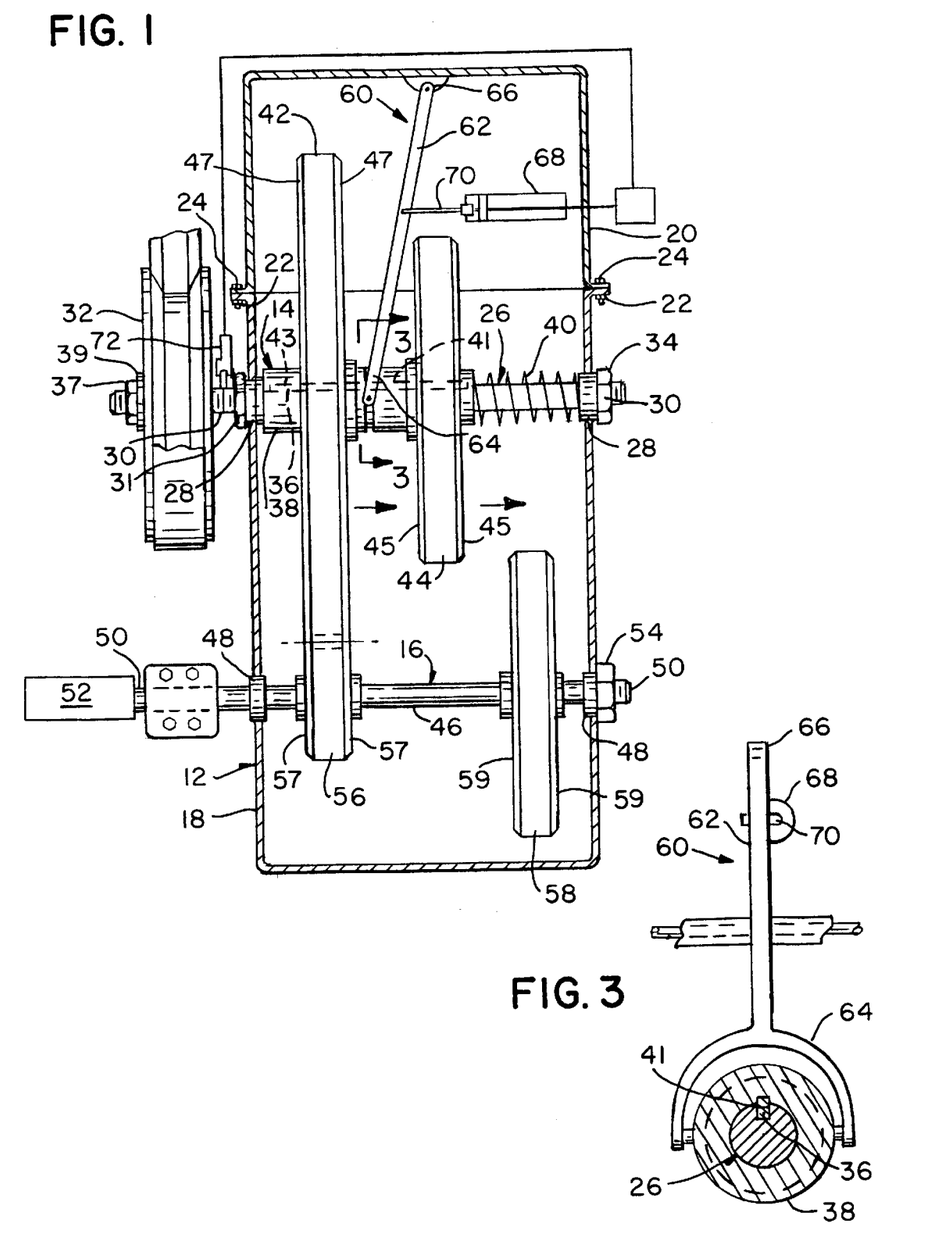
FIG. 1 is a cross sectional view of a two speed embodiment of the present invention engaged in a first speed.
FIG. 3 is an enlarged cross sectional view taken on line 3—3 in FIG. 1 of a speed changer assembly of the two speed embodiment of the present invention shown in FIGS. 1 and 2.
Figure 2:
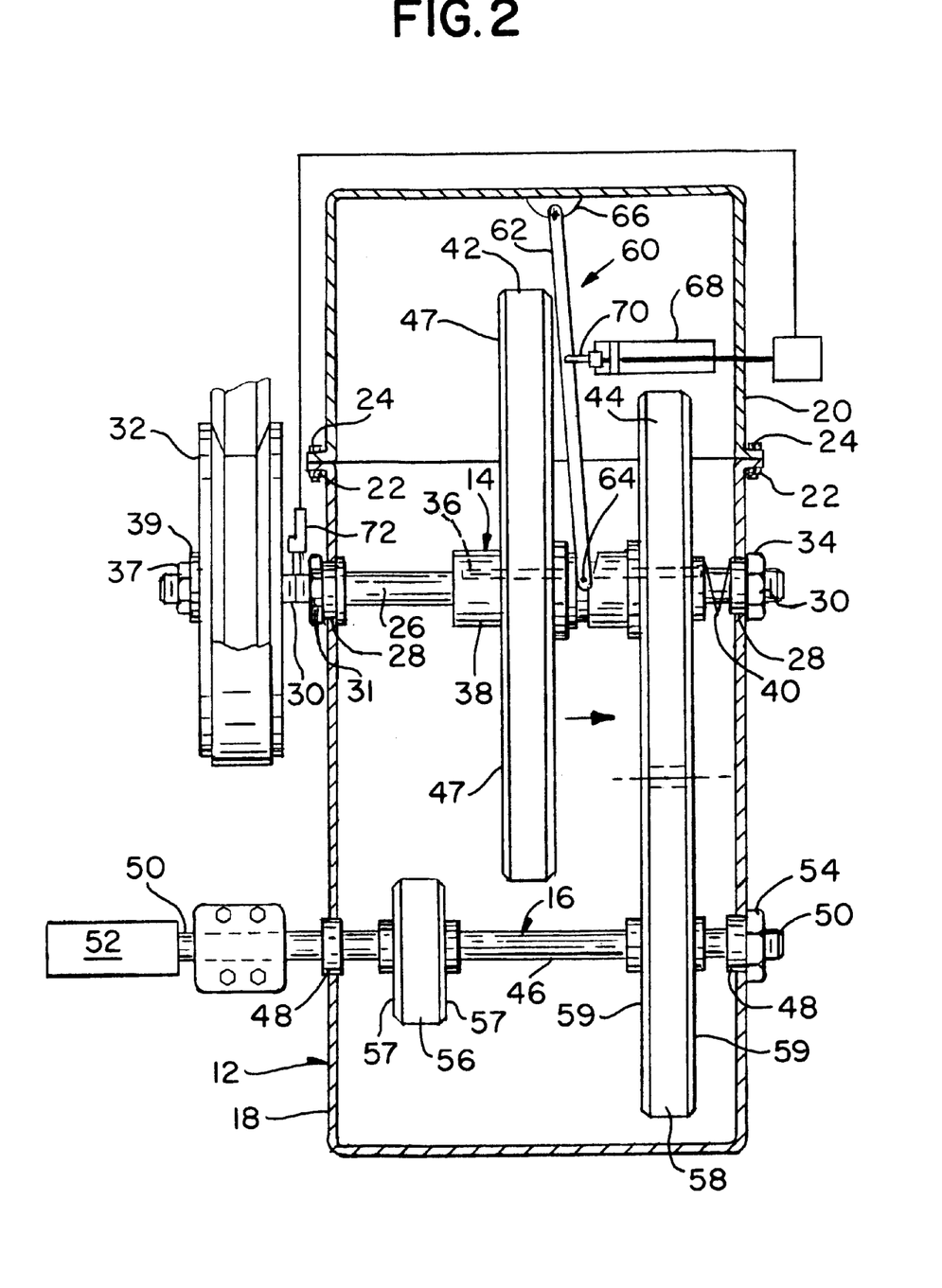
FIG. 2 is a cross sectional view of the two speed embodiment of the present invention engaged in a second speed.

Referring now to the figures, in which like numerals indicate like parts, and particularly to FIGS. 1 and 2, the two speed embodiment of the automatic friction wheel transmission of the present invention is shown generally at 10 engaged in a first speed and a second speed, respectively.

The configuration of the two speed embodiment of the automatic friction wheel transmission 10 can best be seen in FIGS. 1–3, and as such, will be discussed with reference thereto.

The automatic friction wheel transmission 10 comprises an enclosed case 12, an input shaft assembly 14 that is rotatively mounted through the enclosed case 12, and an output shaft assembly 16 that is rotatively mounted through the enclosed case 12 and operatively connected to the input shaft assembly 14 for selective rotation therewith.

The enclosed case 12 comprises a lower portion 18 that has the input shaft assembly 14 and the output shaft assembly 16 rotatively mounted therethrough, and an upper portion 20 that is replaceably attached to the lower portion 18 of the enclosed case 12, by nuts 22 and bolts 24, for allowing access to the input shaft assembly 14 and the output shaft assembly 16.

The input shaft assembly 14 comprises an input shaft 26 that extends rotatively through, and is supported on, the lower portion 18 of the enclosed case 12, by a pair of support bearings 28.

The input shaft 26 of the input shaft assembly 14 has a pair of ends 30 that extend past the lower portion 18 of the enclosed case 12, with one end thereof threadably engaging a nut 31 and for being operatively connected to a prime mover 32, and with the other end thereof threadably engaging another nut 34, with the nut 31 of the input shaft assembly 14 and the another nut 34 of the input shaft assembly 14 preventing the unintentional removal of the input shaft assembly 14 from the enclosed case 12.

The input shaft 26 of the input shaft assembly 14 further has a keyway 36 that extends axially therealong.

The input shaft assembly 14 further comprises a sleeve 38 that is disposed in the enclosed case 12 and receives the input shaft 26 of the input shaft assembly 14.

The sleeve 38 of the input shaft assembly 14 is biased towards the prime mover 32 by a coil spring 40 that receives the input shaft 26 of the input shaft assembly 14 and abuts against a support bearing of the pair of support bearings 28 of the input shaft assembly 14.

The sleeve 38 of the input shaft assembly 14 has a keyway 41 that extends axially therealong.

The keyway 41 in the sleeve 38 of the input shaft assembly 14 is aligned with the keyway 36 in the input shaft 26 of the input shaft assembly 14, with the sleeve 38 of the input shaft assembly 14 being maintained on the input shaft 26 of the input shaft assembly 14 by a key 43 that extends axially through both the keyway 41 in the sleeve 38 of the input shaft assembly 14 and the keyway 36 in the input shaft 26 of the input shaft assembly 14, and which allows the sleeve 38 of the input shaft assembly 14 to rotate with the input shaft 26 of the input shaft assembly 14, yet ride axially therealong.

The input shaft assembly 14 further comprises a low speed friction wheel 42 that has all of its edges 47 beveled to facilitate engagement, and is disposed in the enclosed case 12, on the sleeve 38 of the input shaft assembly 14 for rotation therewith, and adjacent the prime mover 32.

The input shaft assembly 14 further comprises a high speed friction wheel 44 that has all of its edges 45 beveled to facilitate engagement, and is disposed in the enclosed case 12, on the sleeve 38 of the input shaft assembly 14 for rotation therewith, spaced from the low speed friction wheel 42 of the input shaft assembly 14, and away from the prime mover 21.

The output shaft assembly 16 comprises an output shaft 46 that extends rotatively through, and is supported on, the lower portion 18 of the enclosed case 12, by a pair of support bearings 48.

The output shaft 46 of the output shaft assembly 16 has a pair of ends 50 that extend past the lower portion 18 of the enclosed case 12, with one end thereof for being operatively connected to a load 52, and with the other end thereof threadably engaging a nut 54, with the nut 54 of the out shaft assembly 16 preventing the unintentional removal of the output shaft assembly 16 from the enclosed case 12.

The output shaft assembly 16 further comprises a low speed friction wheel 56 that has all of its edges 57 beveled to facilitate engagement, and is disposed in the enclosed case 12, on the output shaft 46 of the output shaft assembly 16 for rotation therewith, and selectively engages the low speed friction wheel 42 of the input shaft assembly 14.

The output shaft assembly 16 further comprises a high speed friction wheel 58 that has all of its edges 59 beveled to facilitate engagement, is disposed in the enclosed case 12, on the output shaft 46 of the output shaft assembly 16 for rotation therewith, spaced from the low speed friction wheel 56 of the output shaft assembly 16, and selectively engages the high speed friction wheel 44 of the input shaft assembly 14.

The automatic friction wheel transmission 10 further comprises a speed changer assembly 60.

The speed changer assembly 60 comprises a fork 62 that is inverted and substantially Y-shaped, and whose bifurcated end 64 straddles, and is pivotally mounted to, the sleeve 38 of the input shaft assembly 14, between the low speed gear 42 of the input shaft assembly 14 and the high speed gear 44 of the input shaft assembly 14, and extends upwardly therefrom to the upper portion 20 of the enclosed case 12, where its other end 66 is pivotally mounted thereto.

The speed changer assembly 60 further comprises a solenoid 68 that is disposed in the upper portion 20 of the enclosed case 12, and whose plunger 70 is pivotally mounted to the fork 62 of the speed changer assembly 60, between its bifurcated end 64 and its other end 66.

The speed changer assembly 60 further comprises a speed sensor 72 that is operatively connected to the input shaft 26 of the input shaft assembly 14, externally to the enclosed case 12, and is in electrical communication with the solenoid 68 of the speed changer assembly 60.

The low speed friction wheel 42 of the input shaft assembly 14 engages the low speed friction wheel 56 of the output shaft assembly 16 and the high speed friction wheel 44 of the input shaft assembly 14 is disengaged from the high speed friction wheel 58 of the output shaft assembly 16 when the speed sensor 72 of the speed changer assembly 60 initially senses a low speed of the input shaft 26 of the input shaft assembly 14.

The low speed friction wheel 42 of the input shaft assembly 14 disengages from the low speed friction wheel 56 of the output shaft assembly 16 and the high speed friction wheel 44 of the input shaft assembly 14 engages the high speed friction wheel 48 of the output shaft assembly 16 when the speed sensor 72 of the speed changer assembly 60 senses a high speed of the input shaft 26 of the input shaft assembly 14, by virtue of the speed sensor 72 of the speed changer assembly 60 activating the solenoid 68 of the speed changer assembly 60, which causes the fork 62 of the speed changer assembly 60 to pivot, which causes the sleeve 38 to slide axially along the input shaft 26 of the input shaft assembly 14, with the low speed friction wheel 42 of the input shaft assembly 14 and the high speed friction wheel 44 of the input shaft assembly 14 moving therewith.

The high speed friction wheel 44 of the input shaft assembly 14 disengages from the high speed friction wheel 58 of the output shaft assembly 16 and the low speed friction wheel 42 of the input shaft assembly 14 reengages the low speed friction wheel 56 of the output shaft assembly 16 when the speed sensor 72 of the speed changer assembly 60 again senses a low speed of the input shaft 26 of the input shaft assembly 14, by virtue of the speed sensor 72 of the speed changer assembly 60 deactivating the solenoid 68 of the speed changer assembly 60, which causes the coil spring 40 of the input shaft assembly 14 to cause the sleeve 38 to slide axially along the input shaft 26 of the input shaft assembly 14 in the opposite direction, with the low speed friction wheel 42 of the input shaft assembly 14 and the high speed friction wheel 44 of the input shaft assembly 14 moving therewith.

Figure 4:
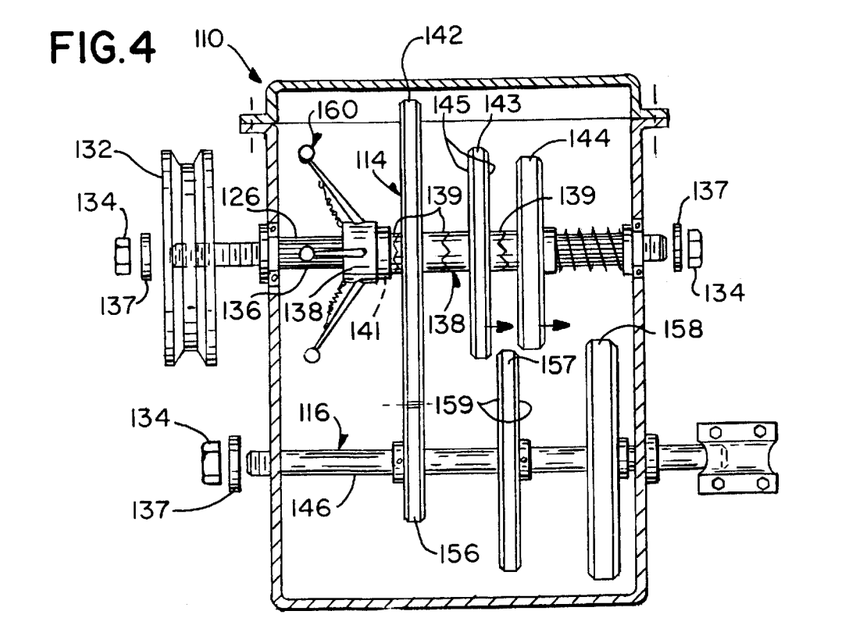
FIG. 4 is a cross sectional view of a three speed embodiment of the present invention engaged in a first speed.
Figure 5:
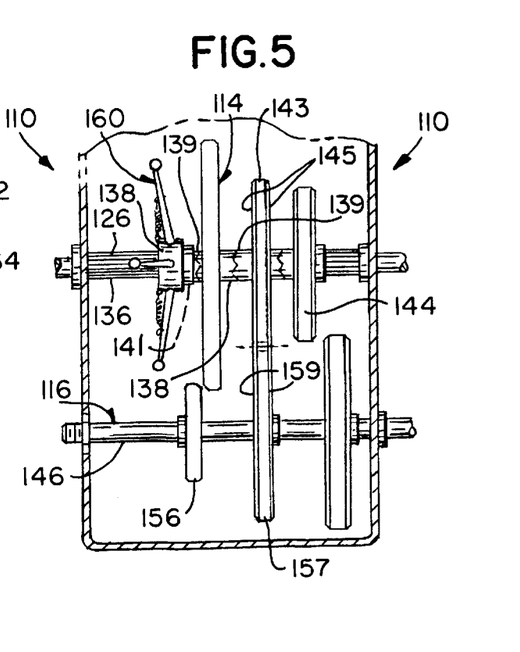
FIG. 5 is a cross sectional view of the three speed embodiment of the present invention engaged in a second speed.
Figure 6:
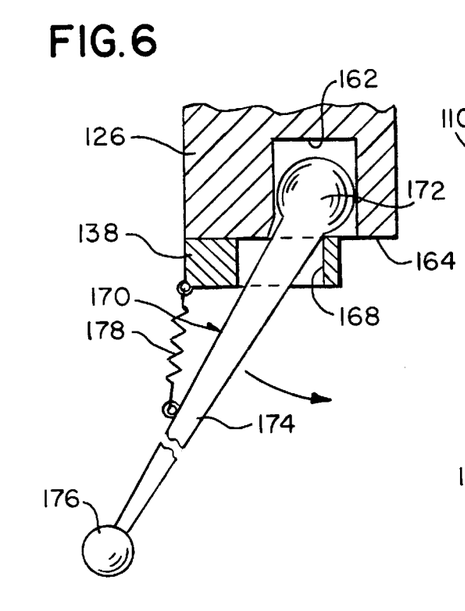
FIG. 6 is an enlarged cross sectional view of the area generally enclosed by the dotted ellipse identified by arrow 6 in FIG. 4 of a speed changer assembly of the three speed embodiment of the present invention shown in FIGS. 4 and 5.

The configuration of the three speed embodiment of the automatic friction wheel transmission of the present invention is shown generally at 110, and can best be seen in FIGS. 4–6, and as such, will be discussed with reference thereto.

The automatic friction wheel transmission 110 is similar to the automatic friction wheel transmission 10, but with the following differences.

The input shaft assembly 114 further comprises an intermediate speed friction wheel 143 whose edges 145 are beveled to facilitate engagement, and which is disposed on the sleeve 138 of the input shaft assembly 114 for rotation therewith, between the low speed frictional wheel 142 of the input shaft assembly 114 and the high speed friction wheel 144 of the input shaft assembly 114.

The sleeve 138 of the input shaft assembly 114 is divided axially by slip clutches 139 to prevent binding, with one slip clutch of the slip clutches 139 of the input shaft assembly 114 disposed between the speed changer assembly 160 and the low speed friction wheel 142 of the input shaft assembly 114, with another clutch of the slip clutches 139 of the input shaft assembly 114 disposed between the low speed friction wheel 142 of the input shaft assembly 114 and the intermediate speed friction wheel 143 of the input shaft assembly 114, and with another clutch of the slip clutches 139 of the input shaft assembly 114 disposed between the intermediate speed friction wheel 143 of the input shaft assembly 114 and the high speed friction wheel 144 of the input shaft assembly 114.

The keyway 36 in the input shaft 26 of the input shaft assembly 14 is replaced by splines 136 that extend axially therealong, the keyway 41 in the sleeve 38 of the input shaft assembly 14 is replaced by corresponding grooves 141 that extend axially therealong, and the key 43 of the input shaft assembly 14 is eliminated.

The corresponding grooves 141 in the sleeve 138 of the input shaft assembly 114 receive the splines 136 on the input shaft 126 of the input shaft assembly 114, which allows the sleeve 138 of the input shaft assembly 114 to rotate with the input shaft 126 of the input shaft assembly 114, yet ride axially therealong.

The output shaft assembly 116 further comprises an intermediate speed friction wheel 157 whose edges 159 are beveled to facilitate engagement, and is disposed on the output shaft 146 of the output shaft assembly 116 for rotation therewith, between the low speed frictional wheel 156 of the output shaft assembly 116 and the high speed friction wheel 158 of the output shaft assembly 116, and selectively engages the intermediate friction wheel 143 of the input shaft assembly 114.

The speed changer assembly 60 is replaced by the speed changer assembly 160.

The speed changer assembly 160 comprises the input shaft 126 of the input shaft assembly 114 having a plurality of bores 162 that are equally spaced-apart, extend radially inwardly from its exterior 164, and are disposed between the prime mover 132 and the low speed friction wheel 142 of the input shaft assembly 114.

The speed changer assembly 160 further comprises the sleeve 138 of the input shaft assembly 114 having a plurality of throughbores 168 that are equally spaced-apart, extend radially therethrough, and are in selective communication with the plurality of bores 162 in the input shaft 126 of the input shaft assembly 114.

The speed changer assembly 160 further comprises a plurality of arms 170.

Each arm of the plurality of arms 170 of the speed changer assembly 160 has a proximal end 172 that pivots axially in a respective bore of the plurality of bores 162 in the input shaft 126 of the input shaft assembly 114, and a body 174 that extends outwardly from the proximal end 172 of a respective arm of the plurality of arms 170 of the speed changer assembly 160, through a respective throughbore of the plurality of throughbores 168 in the sleeve 138 of the input shaft assembly 114, where it is pivotally mounted for axial pivoting, and terminates in a distal end 176 that is spherically-shaped.

The speed changer assembly 160 further comprises a plurality of springs 178.

Each spring of the plurality of springs 178 of the speed changer assembly 160 extends radially outwardly from the sleeve 138 of the input shaft assembly 114 to, and biases inwardly, a respective arm of the plurality of arms 174 of the speed changer assembly 160.

The low speed friction wheel 142 of the input shaft assembly 114 engages the low speed friction wheel 156 of the output shaft assembly 116, the intermediate friction wheel 143 of the input shaft assembly 114 is disengaged from the intermediate friction wheel 157 of the output shaft assembly 116, and the high speed friction wheel 144 of the input shaft assembly 114 is disengaged from the high speed friction wheel 158 of the output shaft assembly 116 when the speed of the input shaft 126 of the input shaft assembly 114 is a low speed.

The low speed friction wheel 142 of the input shaft assembly 114 disengages from the low speed friction wheel 156 of the output shaft assembly 116 and the intermediate friction wheel 143 of the input shaft assembly 114 engages the intermediate friction wheel 157 of the output shaft assembly 116 when the speed of the input shaft 126 of the input shaft assembly 114 is an intermediate speed, by virtue of the centrifugal force created by the rotating input shaft 126 of the input shaft assembly 114 causing the plurality of arms 174 of the speed changer assembly 160 to pivot outwardly against the biasing of the plurality of springs 178 of the speed changer 160, which causes the sleeve 138 of the input shaft assembly 114 to slide axially along the input shaft 126 of the input shaft assembly 114, with the low speed friction wheel 142 of the input shaft assembly 114 and the intermediate friction wheel 143 of the input shaft assembly 114 moving therewith.

The intermediate friction wheel 143 of the input shaft assembly 114 disengages from the intermediate friction wheel 157 of the output shaft assembly 116 and the high speed friction wheel 144 of the input shaft assembly 114 engages the high speed friction wheel 158 of the output shaft assembly 116 when the speed of the input shaft 126 of the input shaft assembly 114 is a high speed, by virtue of the increased centrifugal force created by the rotating input shaft 126 of the input shaft assembly 114 causing the plurality of arms 174 of the speed changer assembly 160 to pivot further outwardly, which causes the sleeve 138 of the input shaft assembly 114 to slide further axially along the input shaft 126 of the input shaft assembly 114, with the intermediate friction wheel 143 of the input shaft assembly 114 and the high speed friction wheel 144 of the input shaft assembly 114 moving therewith.

The high speed friction wheel 144 of the input shaft assembly 114 disengages from the high speed friction wheel 158 of the output shaft assembly 116 and the intermediate friction wheel 143 of the input shaft assembly 114 reengages the intermediate friction wheel 157 of the output shaft assembly 116 when the speed of the input shaft 126 of the input shaft assembly 114 is again an intermediate speed, by virtue of the reduced centrifugal force created by the rotating input shaft 126 of the input shaft assembly 114 causing the plurality of arms 174 of the speed changer assembly 160 to pivot inwardly by the biasing of the plurality of spring 178 of the speed changer assembly 160, which causes the sleeve 138 of the input shaft assembly 114 to slide axially along the input shaft 126 of the input shaft assembly 114 in the opposite direction, with the intermediate friction wheel 143 of the input shaft assembly 114 and the high speed friction wheel 144 of the input shaft assembly 114 moving therewith.

The intermediate friction wheel 143 of the input shaft assembly 114 disengages from the intermediate friction wheel 157 of the output shaft assembly 116 and the low speed friction wheel 142 of the input shaft assembly 114 reengages the low speed friction wheel 156 of the output shaft assembly 116 when the speed of the input shaft 126 of the input shaft assembly 114 is again a low speed, by virtue of the further reduced centrifugal force created by the rotating input shaft 126 of the input shaft assembly 114 causing the plurality of arms 174 of the speed changer assembly 160 to pivot further inwardly by the further biasing of the plurality of springs 178 of the speed changer 160, which causes the sleeve 138 of the input shaft assembly 114 to slide further axially along the input shaft 126 of the input shaft assembly 114 in the opposite direction, with the low speed friction wheel 142 of the input shaft assembly 114 and the intermediate friction wheel 143 of the input shaft assembly 114 moving therewith.

It will be understood that each of the elements described above, or two or more together, may also find a useful application in other types of constructions differing from the types described above.

While the invention has been illustrated and described as embodied in an automatic friction wheel transmission, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An automatic friction wheel transmission, comprising:
    a) an enclosed case;
    b) an input shaft assembly rotatively mounted through said enclosed case; and
    c) an output shaft assembly rotatively mounted through said enclosed case and operatively connected to said input shaft assembly for selective rotation therewith, wherein said enclosed case comprises:
        i) a lower portion that has said input shaft assembly and said output shaft assembly rotatively mounted therethrough; and
        ii) an upper portion that is replaceably attached to said lower portion of said enclosed case, by nuts and bolts, for allowing access to said input shaft assembly and said output shaft assembly, wherein said input shaft assembly comprises an input shaft that extends rotatively through, and is supported on, said lower portion of said enclosed case, by a pair of support bearings, wherein said input shaft of said input shaft assembly has a pair of ends that extend past said lower portion of said enclosed case, with one end thereof threadably engaging a nut and for being operatively connected to a prime mover, and with the other end thereof threadably engaging another nut, with said nut of said input shaft assembly and said another nut of said input shaft assembly preventing the unintentional removal of said input shaft assembly from said enclosed case, wherein said input shaft assembly further includes a sleeve that is disposed in said enclosed case and receives said input shaft of said input shaft assembly, wherein said sleeve of said input shaft assembly is biased towards the prime mover by a coil spring that receives said input shaft of said input shaft assembly, and which abuts against a support bearing of said pair of support bearings of said input shaft assembly.

2. The transmission as defined in claim 1, wherein said input shaft assembly further comprises a low speed friction wheel that has all of its edges beveled to facilitate engagement, and is disposed in said enclosed case, on said sleeve of said input shaft assembly for rotation therewith, and adjacent the prime mover.

3. The transmission as defined in claim 2, wherein said input shaft assembly further comprises a high speed friction wheel that has all of its edges beveled to facilitate engagement, and is disposed in said enclosed case, on said sleeve of said input shaft assembly for rotation therewith, spaced from said low speed friction wheel of said input shaft assembly, and away from the prime mover.

4. The transmission as defined in claim 3, wherein said output shaft assembly comprises an output shaft that extends rotatively through, and is supported on, said lower portion of said enclosed case, by a pair of support bearings.

5. The transmission as defined in claim 4, wherein said output shaft of said output shaft assembly has a pair of ends that extend past said lower portion of said enclosed case, with one end thereof for being operatively connected to a load, and with the other end thereof threadably engaging a nut, with said nut of said output shaft assembly preventing the unintentional removal of said output shaft assembly from said enclosed case.

6. The transmission as defined in claim 4, wherein said output shaft assembly further comprises a low speed friction wheel that has all of its edges beveled to facilitate engagement, and is disposed in said enclosed case, on said output shaft of said output shaft assembly for rotation therewith, and selectively engages said low speed friction wheel of said input shaft assembly.

7. The transmission as defined in claim 6, wherein said output shaft assembly further comprises a high speed friction wheel that has all of its edges beveled to facilitate engagement, is disposed in said enclosed case, on said output shaft of said output shaft assembly for rotation therewith, spaced from said low speed friction wheel of said output shaft assembly, and selectively engages said high speed friction wheel of said input shaft assembly.

8. The transmission as defined in claim 7; further comprising a speed changer assembly.

9. The transmission as defined in claim 8, wherein said speed changer assembly comprises a fork that is inverted and substantially Y-shaped, and whose bifurcated end straddles, and is pivotally mounted to, said sleeve of said input shaft assembly, between said low speed gear of said input shaft assembly and said high speed gear of said input shaft assembly, and extends upwardly therefrom to said upper portion of said enclosed case, where its other end is pivotally mounted thereto.

10. The transmission as defined in claim 9, wherein said speed changer further comprises a solenoid that is disposed in said upper portion of said enclosed case, and whose plunger is pivotally mounted to said fork of said speed changer assembly, between its bifurcated end and its other end.

11. The transmission as defined in claim 10, wherein said speed changer further comprises a speed sensor that is operatively connected to said input shaft of said input shaft assembly, externally to said enclosed case, and is in electrical communication with said solenoid of said speed changer assembly.

12. The transmission as defined in claim 11, wherein said low speed friction wheel of said input shaft assembly engages said low speed friction wheel of said output shaft assembly and said high speed friction wheel of said input shaft assembly is disengaged from the high speed friction wheel of the output shaft assembly when said speed sensor of said speed changer assembly initially senses a low speed of said input shaft of said input shaft assembly.

13. The transmission as defined in claim 12, wherein said low speed friction wheel of said input shaft assembly disengages from said low speed friction wheel of said output shaft assembly and said high speed friction wheel of said input shaft assembly engages said high speed friction wheel of said output shaft assembly when said speed sensor of said speed changer assembly senses a high speed of said input shaft of said input shaft assembly, by virtue of said speed sensor of said speed changer assembly activating said solenoid of said speed changer assembly, which causes said fork of said speed changer assembly to pivot, which causes said sleeve to slide axially along said input shaft of said input shaft assembly, with said low speed friction wheel of said input shaft assembly and said high speed friction wheel of said input shaft assembly moving therewith.

14. The transmission as defined in claim 13, wherein said high speed friction wheel of said input shaft assembly disengages from said high speed friction wheel of said output shaft assembly and said low speed friction wheel of said input shaft assembly reengages said low speed friction wheel of said output shaft assembly when said speed sensor of said speed changer assembly again senses a low speed of said input shaft of said input shaft assembly, by virtue of said speed sensor of said speed changer assembly deactivating said solenoid of said speed changer assembly, which causes said coil spring of said input shaft assembly to cause said sleeve of said input shaft assembly to slide axially along said input shaft of said input shaft assembly in the opposite direction, with said low speed friction wheel of said input shaft assembly and said high speed friction wheel of said input shaft assembly moving therewith.

15. The transmission as defined in claim 1, wherein said input shaft of said input shaft assembly has a keyway that extends axially therealong.

16. The transmission as defined in claim 15, wherein said sleeve of said input shaft assembly has a keyway that extends axially therealong.

17. The transmission as defined in claim 16, wherein said keyway in said sleeve of said input shaft assembly is aligned with said keyway in said input shaft of said input shaft assembly, with said sleeve of said input shaft assembly being maintained on said input shaft of said input shaft assembly by a key that extends axially through both said keyway in said sleeve of said input shaft assembly and said keyway in said input shaft of said input shaft assembly, and which allows said sleeve of said input shaft assembly to rotate with said input shaft of said input shaft assembly, yet ride axially therealong.

18. The transmission as defined in claim 8, wherein said input shaft assembly further comprises an intermediate speed friction wheel whose edges are beveled to facilitate engagement, and which is disposed on said sleeve of said input shaft assembly for rotation therewith, between said low speed frictional wheel of said input shaft assembly and said high speed friction wheel of said input shaft assembly.

19. The transmission as defined in claim 18, wherein said sleeve of said input shaft assembly is divided axially by slip clutches to prevent binding, with one slip clutch of said slip clutches of said input shaft assembly disposed between said speed changer assembly and said low speed friction wheel of said input shaft assembly, with another clutch of said slip clutches of said input shaft assembly disposed between said low speed friction wheel of said input shaft assembly and said intermediate speed friction wheel of said input shaft assembly, and with another clutch of said slip clutches of said input shaft assembly disposed between said intermediate speed friction wheel of said input shaft assembly and said high speed friction wheel of said input shaft assembly.

20. The transmission as defined in claim 18, wherein said output shaft assembly further comprises an intermediate speed friction wheel whose edges are beveled to facilitate engagement, and is disposed on said output shaft of said output shaft assembly for rotation therewith, between said low speed frictional wheel of said output shaft assembly and said high speed friction wheel of said output shaft assembly, and selectively engages said intermediate friction wheel of said input shaft assembly.

21. The transmission as defined in claim 20, wherein speed changer assembly comprises said input shaft of said input shaft assembly having a plurality of bores that are equally spaced-apart, extend radially inwardly from its exterior, and are disposed between the prime mover and said low speed friction wheel of said input shaft assembly.

22. The transmission as defined in claim 21, wherein speed changer further comprises said sleeve of said input shaft assembly having a plurality of throughbores that are equally spaced-apart, extend radially therethrough, and are in selective communication with said plurality of bores in said input shaft of said input shaft assembly.

23. The transmission as defined in claim 21, at wherein speed changer further comprises a plurality of arms.

24. The transmission as defined in claim 23, wherein each arm of said plurality of arms of said speed changer assembly has:

a) a proximal end that pivots axially in a respective bore of said plurality of bores in said input shaft of said input shaft assembly; and b) a body that extends outwardly from said proximal end of a respective arm of said plurality of arms of said speed changer assembly, through a respective throughbore of said plurality of throughbores in said sleeve of said input shaft assembly, where it is pivotally mounted for axial pivoting, and terminates in a distal end that is spherically-shaped.

25. The transmission as defined in claim 24, wherein said speed changer assembly further comprises a plurality of springs.

26. The transmission as defined in claim 25, wherein each spring of said plurality of springs of said speed changer assembly extends radially outwardly from said sleeve of said input shaft assembly to, and biases inwardly, a respective arm of said plurality of arms of said speed changer assembly.

27. The transmission as defined in claim 26, wherein said low speed friction wheel of said input shaft assembly engages said low speed friction wheel of said output shaft assembly, said intermediate friction wheel of said input shaft assembly is disengaged from said intermediate friction wheel of said output shaft assembly, and said high speed friction wheel of said input shaft assembly is disengaged from said high speed friction wheel of said output shaft assembly when the speed of said input shaft of said input shaft assembly is a low speed.

28. The transmission as defined in claim 27, wherein said low speed friction wheel of said input shaft assembly disengages from said low speed friction wheel of said output shaft assembly and said intermediate friction wheel of said input shaft assembly engages said intermediate friction wheel of said output shaft assembly when the speed of said input shaft of said input shaft assembly is an intermediate speed, by virtue of the centrifugal force created by said rotating input shaft of said input shaft assembly causing said plurality of arms of said speed changer assembly to pivot outwardly against the biasing of said plurality of springs of said speed changer, which causes said sleeve of said input shaft assembly to slide axially along said input shaft of said input shaft assembly, with said low speed friction wheel of said input shaft assembly and said intermediate friction wheel of said input shaft assembly moving therewith.

29. The transmission as defined in claim 28, wherein said high speed friction wheel of said input shaft assembly engages said high speed friction wheel of said output shaft assembly and said intermediate friction wheel of said input shaft assembly disengages from said intermediate friction wheel of said output shaft assembly when said speed of said input shaft of said input shaft assembly is a high speed, by virtue of the increased centrifugal force created by said rotating input shaft of said input shaft assembly causing said plurality of arms of said speed changer assembly to pivot further outwardly, which causes said sleeve of said input shaft assembly to slide further axially along said input shaft of said input shaft assembly, with said intermediate friction wheel of said input shaft assembly and said high speed friction wheel of said input shaft assembly moving therewith.

30. The transmission as defined in claim 29, wherein said high speed friction wheel of said input shame assembly disengages from said high speed friction wheel of said output shaft assembly and said intermediate friction wheel of said input shaft assembly reengages said intermediate friction wheel of said output shaft assembly when the speed of said input shaft of said input shaft assembly is again an intermediate speed, by virtue of the reduced centrifugal force created by said rotating input shaft of said input shaft assembly causing said plurality of arms of said speed changer assembly to pivot inwardly by the biasing of said plurality of spring of said speed changer assembly, which causes said sleeve of said input shaft assembly to slide axially along said input shaft of said input shaft assembly in the opposite direction, with said intermediate friction wheel of said input shaft assembly and said high speed friction wheel of said input shaft assembly moving therewith.

31. The transmission as defined in claim 30, wherein said low speed friction wheel of said input shaft assembly reengages said low speed friction wheel of said output shaft assembly and said intermediate friction wheel of said input shaft assembly disengages from said intermediate friction wheel of said output shaft assembly when the speed of said input shaft of said input shaft assembly is again a low speed, by virtue of the further reduced centrifugal force created by said rotating input shaft of said input shaft assembly causing said plurality of arms of said speed changer assembly to pivot further inwardly by the further biasing of said plurality of springs of said speed changer, which causes said sleeve of said input shaft assembly to slide further axially along said input shaft of said input shaft assembly in the opposite direction, with said low speed friction wheel of said input shaft assembly and said intermediate friction wheel of said input shaft assembly moving therewith.

32. The transmission as defined in claim 1, wherein said input shaft of said input shaft assembly has splines that extend axially therealong, and said sleeve of said input shaft assembly has corresponding grooves that extend axially therealong.

33. The transmission as defined in claim 32, wherein said corresponding grooves in said sleeve of said input shaft assembly receive said splines on said input shaft of said input shaft assembly, which allows said sleeve of said input shaft assembly to rotate with said input shaft of said input shaft assembly, yet ride axially therealong.

* * * * *